United States Patent
Kurtz et al.

(10) Patent No.: US 8,497,757 B2
(45) Date of Patent: Jul. 30, 2013

(54) METHOD AND APPARATUS FOR PREVENTING CATASTROPHIC CONTACT FAILURE IN ULTRA HIGH TEMPERATURE PIEZORESISTIVE SENSORS AND TRANSDUCERS

(75) Inventors: Anthony D. Kurtz, Saddle River, NJ (US); Alexander Ned, Kinnelon, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 496 days.

(21) Appl. No.: 12/686,990

(22) Filed: Jan. 13, 2010

(65) Prior Publication Data

US 2010/0107773 A1 May 6, 2010

Related U.S. Application Data

(60) Continuation-in-part of application No. 12/455,922, filed on Jun. 9, 2009, now abandoned, which is a division of application No. 11/412,024, filed on Apr. 26, 2006, now abandoned.

(51) Int. Cl.
*G01L 1/22* (2006.01)

(52) U.S. Cl.
USPC .................. 338/2; 338/13; 338/47

(58) Field of Classification Search
None
See application file for complete search history.

(56) References Cited

U.S. PATENT DOCUMENTS

| | | | |
|---|---|---|---|
| 1,304,623 A | 5/1919 | Sullivan et al. | |
| 4,111,717 A | 9/1978 | Baxter | |
| 4,163,656 A | 8/1979 | Monneraye et al. | |
| 4,316,942 A | 2/1982 | Kuo | |
| 5,118,581 A | 6/1992 | Shalaby | |
| 5,286,671 A | 2/1994 | Kurtz et al. | |
| 5,416,049 A | 5/1995 | Mattox | |
| 5,618,764 A | 4/1997 | Usui et al. | |
| 5,955,771 A | 9/1999 | Kurtz et al. | |
| 5,973,590 A | 10/1999 | Kurtz et al. | |
| 6,210,989 B1 | 4/2001 | Kurtz et al. | |
| 6,734,513 B2 | 5/2004 | Seki | |
| 6,762,072 B2 | 7/2004 | Lutz | |
| 7,307,325 B2 | 12/2007 | Kurtz et al. | |

OTHER PUBLICATIONS

NIST, Pyrex Composition. http://physics.nist.gov/cgi-bin/Star/compos.pl?matno=169. No date.*
Springer Handbook of Mechanical Engieering. Karl-Heinrich Grote. 2009, XXVIII, 1580 p. No month.*

* cited by examiner

*Primary Examiner* — Kyung Lee
(74) *Attorney, Agent, or Firm* — Troutman Sanders LLP; James E. Schutz; Jihan A. R. Jenkins

(57) ABSTRACT

A piezoresistive sensor device and a method for making a piezoresistive device are disclosed. The sensor device comprises a silicon wafer having piezoresistive elements and contacts in electrical communication with the elements. The sensor device further comprises a contact glass coupled to the silicon wafer and having apertures aligned with the contacts. The sensor device also comprises a non-conductive frit for mounting the contact glass to a header glass, and a conductive non-lead glass frit disposed in the apertures and in electrical communication with the contacts. The method for making a piezoresistive sensor device, comprises bonding a contact glass to a silicon wafer such that apertures in the glass line up with contacts on the wafer, and filling the apertures with a non-lead glass frit such that the frit is in electrical communication with the contacts. The use of a lead free glass frit prevents catastrophic failure of the piezoresistive sensor and associated transducer in ultra high temperature applications.

13 Claims, 5 Drawing Sheets

METHOD AND APPARATUS FOR PREVENTING CATASTROPHIC CONTACT FAILURE IN ULTRA HIGH TEMPERATURE PIEZORESISTIVE SENSORS AND TRANSDUCERS

CROSS REFERENCE TO RELATED APPLICATIONS

This Application is a Continuation-In-Part application claiming priority under 35 U.S.C. §120 to U.S. patent application Ser. No. 12/455,922, entitled "METHOD AND APPARATUS FOR PREVENTING CATASTROPHIC CONTACT FAILURE IN ULTRA HIGH TEMPERATURE PIEZORESISTIVE SENSORS AND TRANSDUCERS", filed 9 Jun. 2009, which is a Divisional application claiming priority under 35 U.S.C. §121 to U.S. patent application Ser. No. 11/412,024, entitled "METHOD AND APPARATUS FOR PREVENTING CATASTROPHIC CONTACT FAILURE IN ULTRA HIGH TEMPERATURE PIEZORESISTIVE SENSORS AND TRANSDUCERS", filed on 26 Apr. 2006, both of which are hereby incorporated in their entirety as if fully set forth herein.

FIELD OF THE INVENTION

This invention relates to silicon on insulator leadless ultra high temperature pressure transducers and more particularly to a method and apparatus for preventing catastrophic failure of contacts in such transducer.

BACKGROUND OF THE INVENTION

Some years ago, Kulite Semiconductor Products, Inc. (Kulite) had received patents on the method of construction of high temperature silicon on oxide leadless pressure transducers. In our previous art, the method for making the silicon-on-insulator sensor is described in U.S. Pat. No. 5,286,671 entitled "Fusion Bonding Technique for Use in Fabricating Semiconductor Devices" issued on Feb. 15, 1994 to A. D. Kurtz et al. and assigned to Kulite the assignee herein, and the method for making the leadless high temperature transducer structure is described in U.S. Pat. No. 5,955,771 entitled "Sensor for Use in High Vibrational Application and methods for Fabricating Same" issued on Sep. 21, 1999 to A. D. Kurtz et al. and assigned to Kulite. See also U.S. Pat. No. 6,210,989 entitled "Ultra Thin Surface Mount Wafer Sensor Structures and Methods for Fabricating the Same" issued on Apr. 3, 2001 to A. D Kurtz et al. and assigned to the assignee herein. The devices resulting from the methods described in the aforementioned patents permitted the fabrication of structures which were suitable for use up to slightly over 600° C. However, it was found that at approximately 620° C., or greater, there was a catastrophic failure in the electrical contacts to the piezoresistive sensor network. Upon examination by the inventors herein, it was found that the use of the glass metal frit as so described in previous work, reacted with the metalized ohmic contacts and, in fact, dissolved them. In these devices the metalized contact was formed by a layer of platinum silicide, titanium and platinum with the platinum silicide being the layer immediately adjacent to the P+ silicon. It was also found, however, that if a platinum wire was directly bonded to the high temperature contact that no dissolution of the contact occurred when at temperatures as high as 700° C. Upon further observation, it was conjectured by the inventors that certain of the materials in the glass frit in and of themselves, were destroying the metal contact film layer and it was presumed that the presence of lead in the frit was the cause. In fact, the composition of the frit in the aforementioned patents was typically about 60-80% lead, about 5-20% boron, about 5-20% silicon, with about 10-20% of either aluminum or zinc added. Originally, the reason for using a lead containing frit was to lower the melting point of the frit, thus enabling the use of a more simple process to establish electrical continuity between the metal contact layer and the pins on the header. However, it was discovered that at temperatures greater than 620° C. lead could interact with platinum forming a liquidous, thereby dissolving the platinum and destroying the contact. That meant that for high temperature operation, one would require a lead-free glass frit. Such glass frits are commercially available from many sources and their compositions are approximately 50% zinc, without any lead and with a mixture of boron and silicon present. Other commercially available glass frits contain strontium instead of zinc. However, one reason such lead free glass frits were deemed unsuitable for these operations was because the original glass frit melting and softening points were considerably higher than the lead containing glass frits. When using such a lead-free frit, the contact glass (as described in the aforementioned patents), namely borosilicate glass, would not withstand the new firing temperatures required for the firing of the lead-free frits. Accordingly, the present invention resides in the recognition of the problem and implementation of the solution to utilize lead-free glass frits and glass to bond and otherwise utilize such lead-free glasses in the formation of improved high temperature transducer devices.

SUMMARY OF THE INVENTION

Embodiments of the present invention are directed to a piezoresistive sensor device and a method for making a piezoresistive device. The sensor device may comprise a silicon wafer having piezoresistive elements and contacts in electrical communication with the elements. The sensor device may further comprise a contact glass coupled to the silicon wafer and having apertures aligned with the contacts. The sensor device may also comprise a non-conductive frit for mounting the contact glass to a header glass, and a conductive non-lead glass frit disposed in the apertures and in electrical communication with the contacts. The method for making a piezoresistive sensor device, may comprise bonding a contact glass to a silicon wafer such that apertures in the glass line up with contacts on the wafer, and filling the apertures with a non-lead glass frit such that the frit is in electrical communication with the contacts. The use of a lead free glass frit prevents catastrophic failure of the piezoresistive sensor and associated transducer in ultra high temperature applications.

DETAILED DESCRIPTION OF PREFERRED EMBODIMENTS OF THE INVENTION

Figure 1:
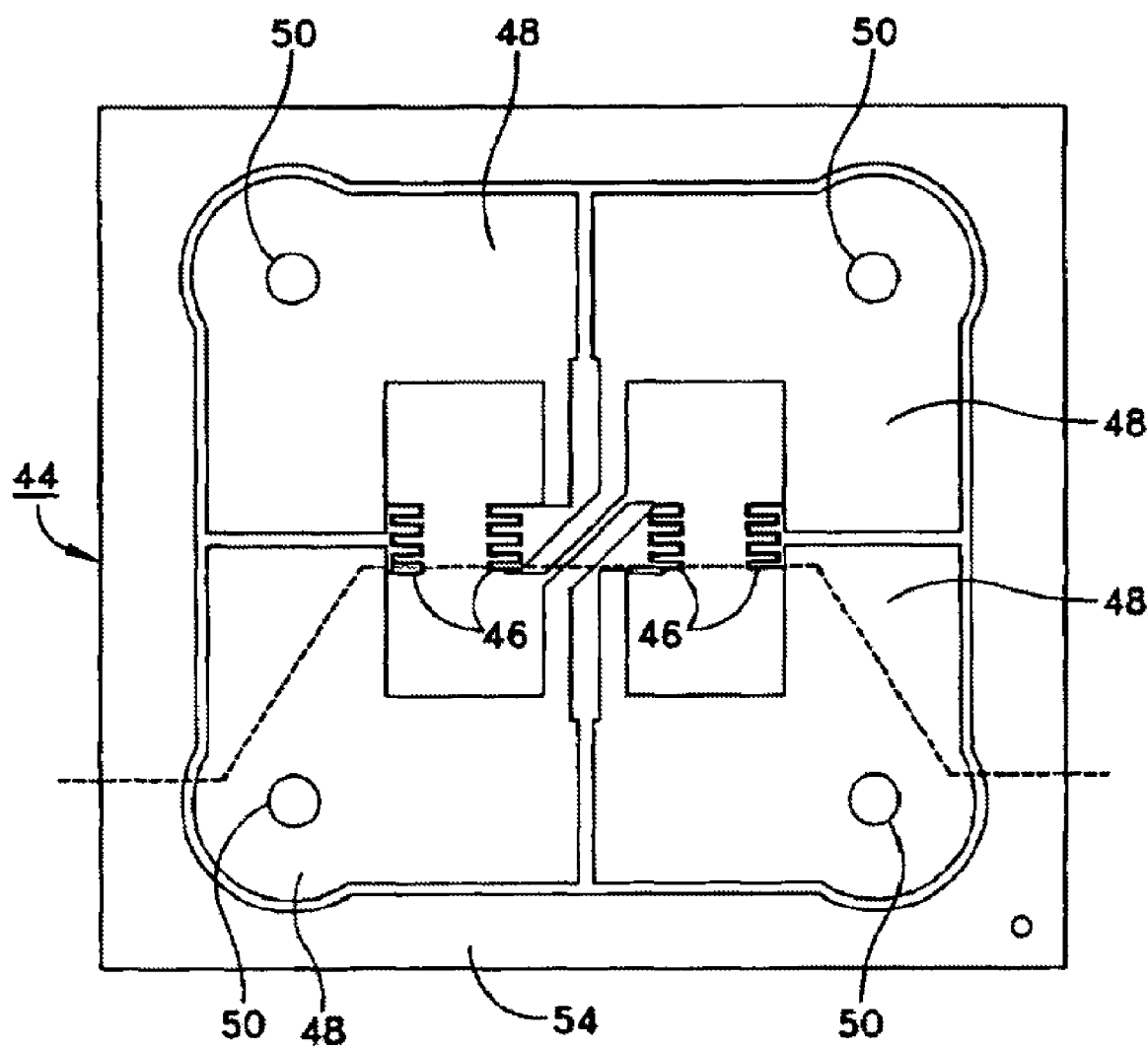
FIG. 1 is a top plan view depicting a SOI leadless sensor according to an embodiment of the invention.

As described herein, the use of lead-free glass frits in a high temperature SOI leadless sensor gave rise to certain unanticipated advantages. Not only was it able to withstand much higher temperatures, but its expansion coefficient was much more closely matched to that of silicon (35 PPM/° C.) and the borosilicate glass versus (85 PPM/° C.) for the lead-bearing frit. In contrast, when the lead-bearing frit was used to fill the holes in the contact glass, the difference in expansion coefficients between the lead-bearing frit and the silicon borosilicate structure gave rise to considerable elastic stress which degraded the device performance.

Furthermore, it was found that in order to use the high temperature, low expansion lead-free frit, a different contact glass was required capable of withstanding the higher melting point of the lead-free glass-metal frit. It was discovered that glasses such as aluminum oxide -zinc oxide-borosilicate glasses, not only had a higher melting point, but matched the silicon expansion coefficients even better. Moreover, this class of glasses had a higher Young's modulus than the borosilicate glasses and, therefore, served to better isolate the silicon sensing elements from external thermal effects, leading to an enhanced device. Use of these various glass frits and contact glasses has enabled one to fabricate transducers which operate to temperatures well in excess of 650° C. During and after exposure to these elevated temperatures the device continues to operate with excellent performance characteristics. Other glasses, such as alkaline-earth aluminosilicate glasses, can alternatively be used.

Bonding a flat surface of silicon to a flat surface of borosilicate glass is a relatively simple process and well known in the art (e.g., using an electrostatic bond). However, to bond a layer of silicon to the aluminum oxide-zinc oxide-borosilicate, or alkaline-earth aluminosilicate, glass using the same technique, presented numerous problems. These glasses have lower conductivity and fewer transportable ions making the formation of an electrostatic bond more difficult. Furthermore, these glasses will only bond easily to an extremely smooth or ultra smooth surface. In the case when one desires to bond these glasses to a P+ on top of silicon oxide region, there are further difficulties. The P+ region as initially fabricated by conductivity selective etch, as in Kulite U.S. Pat. No. 5,286,671 entitled "Fusion Bonding Technique for Use in Fabricating Semiconductor Devices", is rough in texture. Moreover, the areas of P+ used for contact regions were rather large and because of the difference in expansion coefficient between the P+ silicon and the silicon dioxide to which it is affixed, they were frequently under stressed causing wrinkling or dimpling making it almost impossible to seal those P+ regions to these glasses using an electrostatic bond. Therefore, a different method of preparing the P+ regions was necessary. Their extent was reduced and their surfaces were made inherently smoother by continuing with the conductivity selective etch for a short time after the separation had occurred. This additional time in the conductivity selective etch tended to remove more of the P+ silicon up to the most degenerative of the P++ layers, thus resulting in a smoother surface. These modifications in the procedures as well as optimizing the geometry of the structures allowed for easier bonding of the Silicon wafer to the glass.

The sensor structure according to the embodiments of the present invention provides a more ideal mechanical configuration; being stiffer, and better thermally matched in terms of both filling glass-metal frits and in terms of contact and header glasses used in the device fabrication. This new mechanical structure results in more optimized sensor performance characteristics across a wide temperature range of operation (cold to ultra hot). In fact, very accurate and very stable low pressure devices, typically most affected by mechanical stresses, are now possible due to the present sensor construction.

Figure 2:
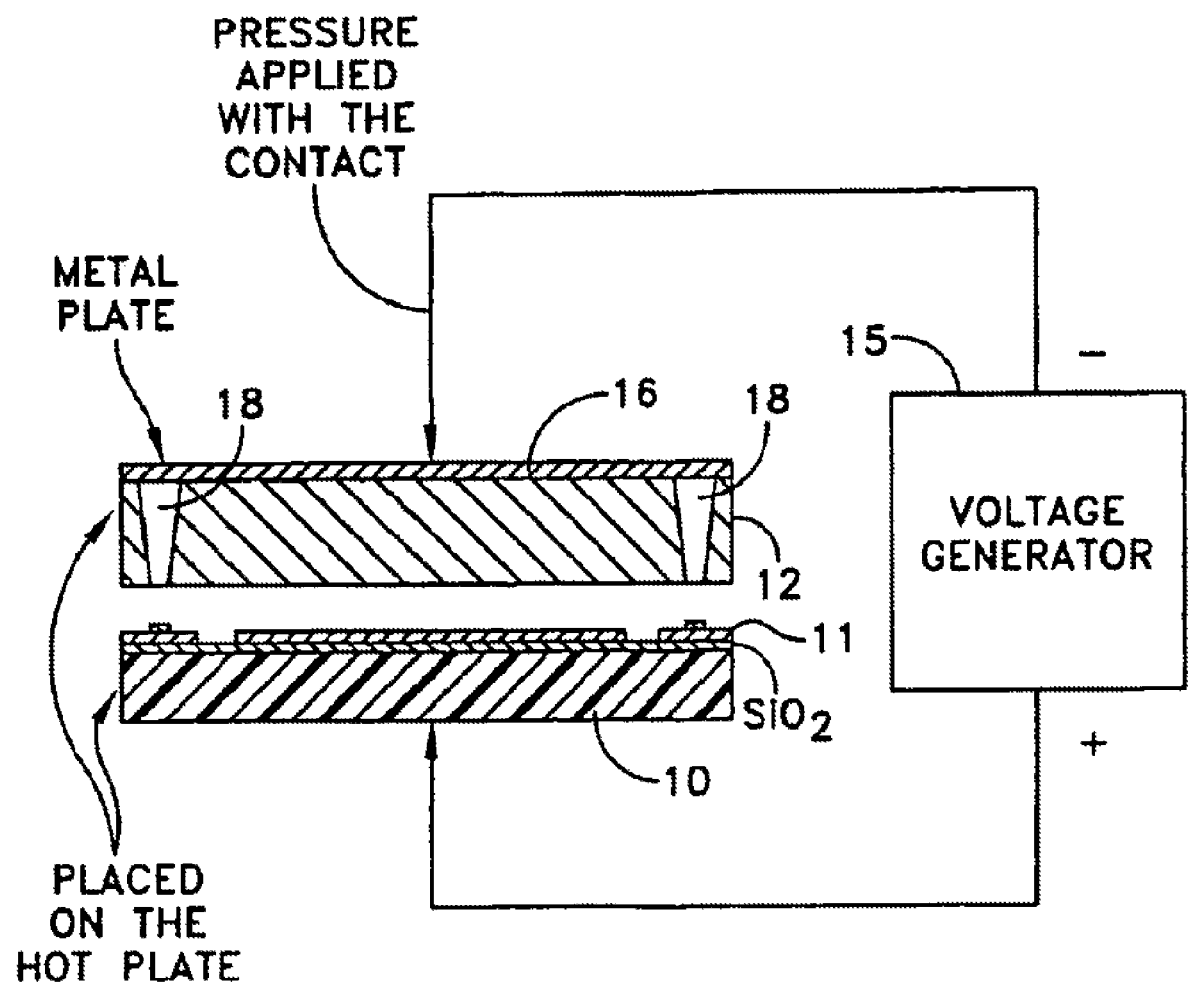
FIG. 2 depicts a schematic diagram showing an electrostatic bonding process according to an embodiment of the invention.
Figure 3:
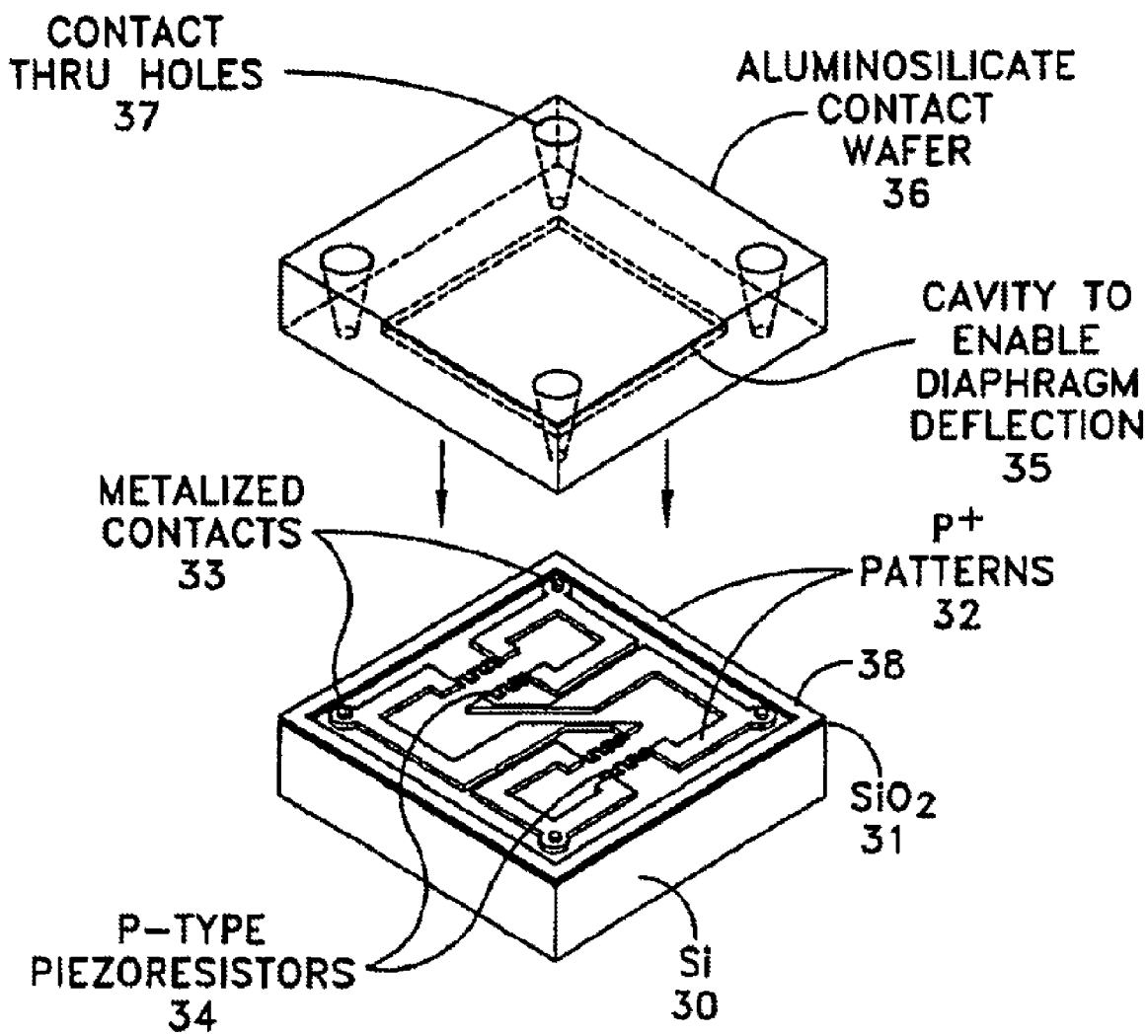
FIG. 3 depicts a perspective view of a SOI sensor according to an embodiment of the invention.

Referring to FIG. 1, there is shown a top view of the surface geometry of an SOI leadless sensor employed in the present invention. It is noted that the leadless sensor shown in FIG. 1 is the same sensor which is described in U.S. Pat. No. 5,955,771 entitled "Sensors for Use in High Vibrational Applications and Methods for Fabricating Same" issued on Sep. 21, 1999. In that patent FIG. 2 shows the top plan view of the sensor as depicted in FIG. 1 of the present invention. Certain differences will be explained. In any event, in order to understand the geometry of FIG. 1, the following becomes pertinent. The pressure sensor (44) is approximately 100 mils by 100 mils or less and is fabricated from two or more semiconductor wafers of silicon, or any other suitable semiconductor wafer material. The transducer (44) is fabricated using conventional wafer processing techniques which enable a number of dielectrically isolated piezoresistive sensor elements such as (46), composed of highly doped P+ silicon to be formed on a semiconductor material using dielectric films of $SiO_2$. It is understood that a number of such sensors can be made at the same time in a large substrate. Each sensor element (46) is essentially a variable resistor comprising one of four legs of a Wheatstone bridge circuit with each of the respective resistances varying in proportion to an applied force or pressure through the transducer (44). The circuit nodes of the Wheatstone bridge consist of four oversized P+ diffuse silicon electrical contact areas or fingers (48). The fingers are mainly located in the non-activating areas of the transducer (44). The term "finger" is used to indicate that the areas (48) project from the sensor (46) to the metal contacts (50). The metal contacts within the contact area are circular in shape and are each approximately 10 mils in diameter. Each contact includes a centrally located area of high temperature platinum-titanium metallization (50). In regard to the above noted patent FIG. 3 shows a cross-sectional view of the structure depicted in FIG. 1. As indicated in the '771 patent, there is shown a bottom view of a cover which is to be bonded to the transducer (44). The cover is fabricated from a glass such as Pyrex. The cover is to be electrostatically bonded without sealing glasses to the transducer (44). The apertures in the cover are filled with a glass frit; typically the glass frit is made of Pyroceram a glass material manufactured by Corning Glass Co. As indicated in the prior art devices, the lead in this glass frit would react with the platinum contacts, turning them into a liquid and thereby destroying conductivity. This presented a significant problem. U.S. Pat. No. 6,210,989 entitled "Ultra Thin Surface Mount Wafer Sensor Structures and Method For Fabricating the Same" also shows transducer devices having glass headers which include glass frits, applied in the apertures of the glass contact member. These structures also failed at temperatures above 600° C.

Referring to FIG. 2, there is shown an electrostatic bonding process which molecularly joins the aluminosilicate glass to the smooth surface (11) of the SOI sensor wafer (10). The P+ region (11) as shown located on a layer of silicon dioxide. The process is performed on a hot plate at high temperatures. A metal plate (16) has a voltage applied by a voltage generator (15) which voltage is applied to the metal plate and also to the silicon wafer (10). The pressure applied to the metal plate which is positioned over the aluminosilicate glass wafer (12) enables bonding of the glass wafer (12) to the surface of the P+ areas (11) associated with the sensor wafer (10). As seen the glass plate or contact plate (12) has the contact aperture (18) located thereon. It is these apertures (18) which eventually will be filled with a glass frit which does not contain lead. The metal plate (16) acts to spread the application or voltage across the entire contact glass wafer (12). As indicated, the composition of the glass frit is utilized in the above-noted patents which was the prior art contained between 60 to 80% lead, between 5-20% boron, and between 5-20% silicon, and with 10-20% of either aluminum or zinc which were added. These are the typical structures of the glass frit employed in the prior art. In any event, as indicated, for high temperature operation it has been discovered herein that a lead free glass frit is required. Such lead free glass frits are commercially available and their compositions are approximately 50% zinc and further containing a mixture of boron and silicon. Lead free glass frits may also comprise strontium instead of zinc. These glasses were never selected for uses in such devices because their melting points or softening points were considerably higher than the lead containing glass frits. Thus, when using such a lead free frit the contact glass (12) as employed in the devices described in the prior art patents, would not withstand the increased firing temperatures required for the firing of the lead free frits. Contact glasses devoid of lead are available from many manufacturers. These glasses typically contain silicon dioxide ($SiO_2$), aluminum oxide ($Al_2O_3$), boron oxide ($B_2O_3$), sodium oxide ($Na_2O$), magnesium oxide (MgO), arsenious oxide as well as zinc oxide and other components. The lead free glasses differ according to the different percentages of such compositions. In any event, the major component of such glasses is typically silicon dioxide with aluminum oxide also a substantial component. The amount of silicon dioxide is generally in the range of about 25-70% of the composition with aluminum oxide being in the range of about 15-30%. Boron oxide amounts are generally in the range of 0-10% with sodium oxide being in the range of about 0-5%. These glasses may also contain magnesium oxide. If magnesium oxide is present, it is normally in the range of 2-5%. These glasses may also contain arsenious oxide, that if present, is the range of 10-20% accordingly. Arsenious oxide is being eliminated from alkaline earth glasses and one uses CaO, BaO, lithium LiO2 or combinations thereof.

As indicated, to bond a piece of silicon as wafer (10) and the P+ regions (11) to a glass contact wafer (12) which is totally devoid of lead using electrostatic bonding technique as depicted in FIG. 2 presents considerable problems. The glass (12) has a lower conductivity and therefore has fewer transportable ions making the formation of electrostatic bond more difficult. Further, the glass (12) will only bond to an ultra smooth surface. Further difficulties arise in the case where one desires to bond the glass wafer (12) to the P+ layer (11) on top of the silicon oxide region. The P+ region (11) as initially fabricated by a conductivity selective edge is a rough surface that basically has a rough texture. Moreover the areas of P+ use or contact regions as seen in the prior patents are rather large and because of the difference in expansion coefficient between the P+ silicon and the silicon dioxide to which it is affixed, they were frequently under stress and thereby caused wrinkling or dimpling. The wrinkling or dimpling made it almost impossible to seal those P+ regions to the glass wafer (12) using a conventional electrostatic or anoded bond. Therefore, a different method of preparing the P+ regions was necessary. Their extent was reduced and the surfaces were made inherently smoother by continuing with the conductivity selective etching for a short time after separation had occurred. This additional time enabled the conductivity selective etch to remove more of the P+ silicon up to the most degenerate of the P+ layer, thus resulting in a smoother surface. By using these modifications and the procedures, it was possible to bond the P+ region to the glass wafer. In addition, it was found that to use the electrostatic bonding process with the glass wafer (12) that both the temperature at which the bonding occurs as well as the voltage applied had to be increased. In this way the glass wafer could be attached to the P+ regions of the semiconductor wafer (10). Thereafter, the use of the lead free glass frit to position the contacts in the apertures in the glass was possible resulting in an unanticipated and improved structure.

With reference to FIG. 2, electrostatic bonding conditions using lead free glasses are changed compared to the prior art electrostatic bonding techniques. When using borosilicate glass the temperature of the bonding is at 400° C., and it takes about one hour to bond. The voltage used is about 650 volts and the surface of the silicon can be semi-rough. This is according to prior art electrostatic bonding using the prior art glass. In accordance with an exemplary embodiment of the present invention, electrostatically bonding aluminum oxide-zinc oxide-borosilicate glass or other lead free glass may be accomplished at lower temperatures, using lower voltage for a shorter period of time. For example, a lead free contact glass may be bonded by applying a voltage of approximately 300 volts or more at a temperature above 300° C. for 30 minutes or more. It is noted that the surface of the silicon has to be smooth and of high quality and the geometry of the structures must be well controlled. When one uses an alkaline-earth aluminosilicate glass it is seen that the temperature is about 450° C., and that their time is about two hours. Furthermore, the voltage is at least 700 volts and preferably about 900 volts. The surface of the silicon utilizing that glass is of extremely high quality and ultra smooth. The preferred glass is the aluminum oxide-zinc oxide-borosilicate glass. The glass can be utilized in conjunction with glass frits made from aluminum oxide-zinc oxide glass or the alkaline earth aluminosilicate glasses. Specifically, in alkaline earth glasses with no lead, sodium may also be eliminated. Alkaline earth metals such as CaO, BaO, and $LiO_2$ are used in these glasses. The utilization of glass wafers and glass frits is well known as evidenced by the above-noted patents.

Referring to FIG. 3, there is shown a SOI leadless composite chip with an aluminosilicate contact glass wafer (36), which is to be attached to the SOI leadless sensor by means of the electrostatic bond as depicted in FIG. 2. The ultra smooth surface quality of the P+ layer indicated by P+ platinum patterns (32) enables the electrostatic bonding process, which occurs between the aluminosilicate contact glass and the P+ regions of the SOI sensor wafer. In FIG. 3 a silicon wafer (30) is depicted. The silicon wafer has a layer of silicon dioxide (31) grown on the surface. Deposited on the layer of silicon dioxide are P+ patterns which include a peripheral rim (38) and the P+ contact patterns (32). The metallized contacts (33) are shown typically platinum or a platinum compound. Also shown are the P type piezoresistors (34). As is known the aluminosilicate contact wafer (36) shown above has a cavity (35) to enable diaphragm deflection. The contact wafer (36) has contact through holes (37). The contact through hole (37) aligns with each of the metallized contact areas and contact is made to the metalized areas by means of a lead free glass frit.

Figure 4:
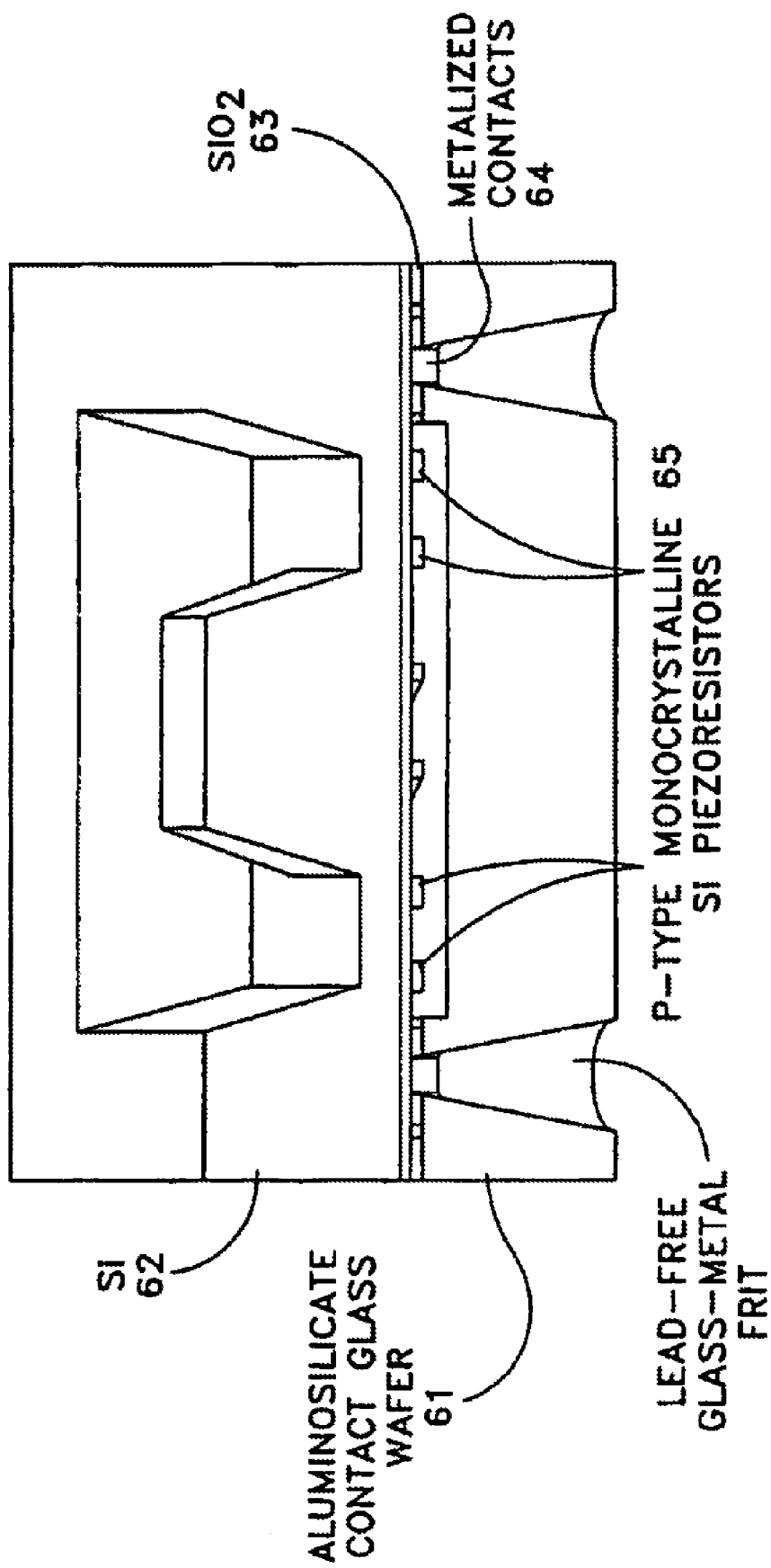
FIG. 4 depicts a sectional view of the sensor depicted in FIG. 3 with the contact glass wafer electrostatically bonded to the silicon wafer.

Referring to FIG. 4 there is shown the composite SOI leadless sensor chip with the contact holes filled with lead free glass metal frit (63). The presence of the aluminosilicate glass enables the ultra high temperature filling process associated with a lead free glass metal frit firing to take place. The glass metal frit may be the lead free glass containing gold or other high conductivity metal such as platinum. As seen in FIG. 4, the silicon chip (62) is analogous to the chip (30) of FIG. 3.

The P type monocrystalline silicon piezoresistors (65) are shown and each of the resistors is directed to a metallized contact (64). The structure is deposited on a layer of silicon dioxide (63). The aluminosilicate contact glass wafer (61) has the apertures which communicate with the contact (64), the apertures being filled with a lead free glass metal frit (60). The lead free glass metal frit and structure of the sensor is depicted in FIG. 4.

Figure 5:
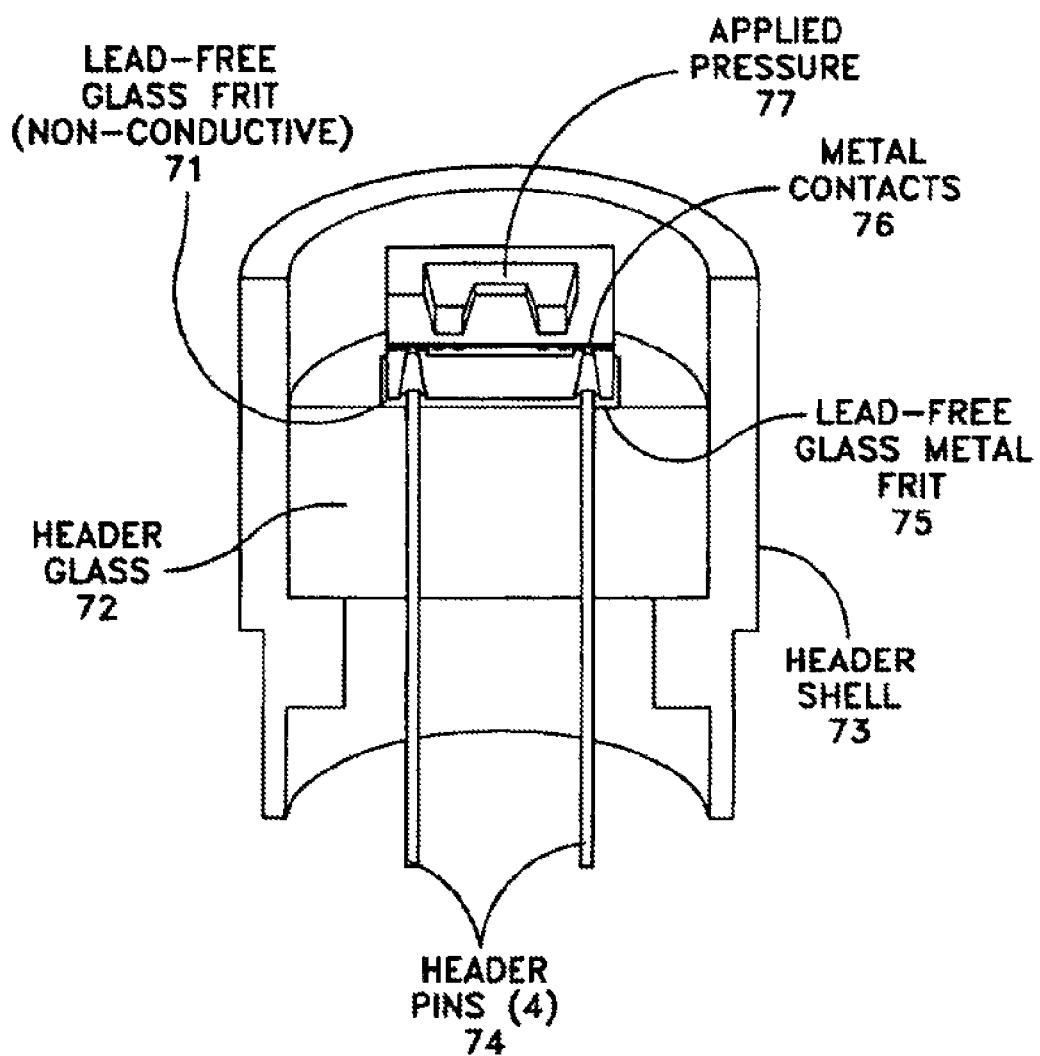
FIG. 5 depicts a partial sectional view of a SOI leadless high temperature sensor mounted on a header including header pins for use in a high temperature environment.

Referring to FIG. 5 there is shown a high temperature leadless composite chip, as for example, the chip depicted in FIG. 4 mounted on a high temperature header (73) using a non-conductive lead free glass frit. As one can see the lead free glass frit, which is non-conductive (71) secures the sensor chip (70) to the header glass wafer (72). The header glass wafer (72) may be a high temperature glass. In any event, as one can see, the metal contact (76) on the sensor wafer is preserved during the high temperature mounting process and during any subsequent device operation. This is due to the removal of lead from the contact interface. The aluminosilicate contact glass makes possible the high temperature mounting process. As seen in FIG. 5, the apertures which are filled with the lead free glass metal frit are now directed to header pins (74). There are normally four header pins associated with a Wheatstone bridge which as one can ascertain a Wheatstone bridge has four active contacts. An applied pressure (77) is applied to the sensor in the active area causing the piezoresistors to respond producing a voltage proportional to the applied pressure. Thus, as seen, there is shown a high temperature sensor transducer which provides an unanticipated, unexpected result in using lead free glasses and lead free frits to form high temperatures sensors and transducers. It will be apparent to those skilled in the art that modifications and variations may be made in the apparatus and process of the present invention without departing from the spirit or scope of the claims. It is intended that the present invention cover the modification and variations of this invention provided they come within the scope of the amended claims and their equivalents.

The invention claimed is:

1. A piezoresistive sensor device comprising:
    a silicon wafer having piezoresistive elements and contacts in electrical communication with the elements;
    a contact glass coupled to the silicon wafer and having apertures aligned with the contacts;
    a non-conductive frit for mounting the contact glass to a header glass; and
    a conductive non-lead glass frit disposed in the apertures and in electrical communication with the contacts.

2. The device of claim 1, the piezoresistive elements separated from the wafer by a dielectric.

3. The device of claim 1 further comprising, an oxide layer between the piezoresistive elements and silicon wafer.

4. The device of claim 1, the frit comprising zinc.

5. The device of claim 1, the frit comprising strontium.

6. The device of claim 4, the frit comprising approximately 50% zinc.

7. The device of claim 4, the frit comprising boron and silicon.

8. The device of claim 1, the contact glass comprising silicon dioxide.

9. The device of claim 8, the contact glass comprising aluminum oxide.

10. The device of claim 9, the contact glass being composed of 25-70% silicon dioxide and 15-30% aluminum oxide.

11. The device of claim 1, wherein the contacts comprise platinum metalization.

12. The device of claim 1, the frit having a thermal expansion coefficient less than 85 PPM/° C.

13. The device of claim 1, wherein the device is capable of operating at a temperature above 650° C.

* * * * *